UNITED STATES PATENT OFFICE.

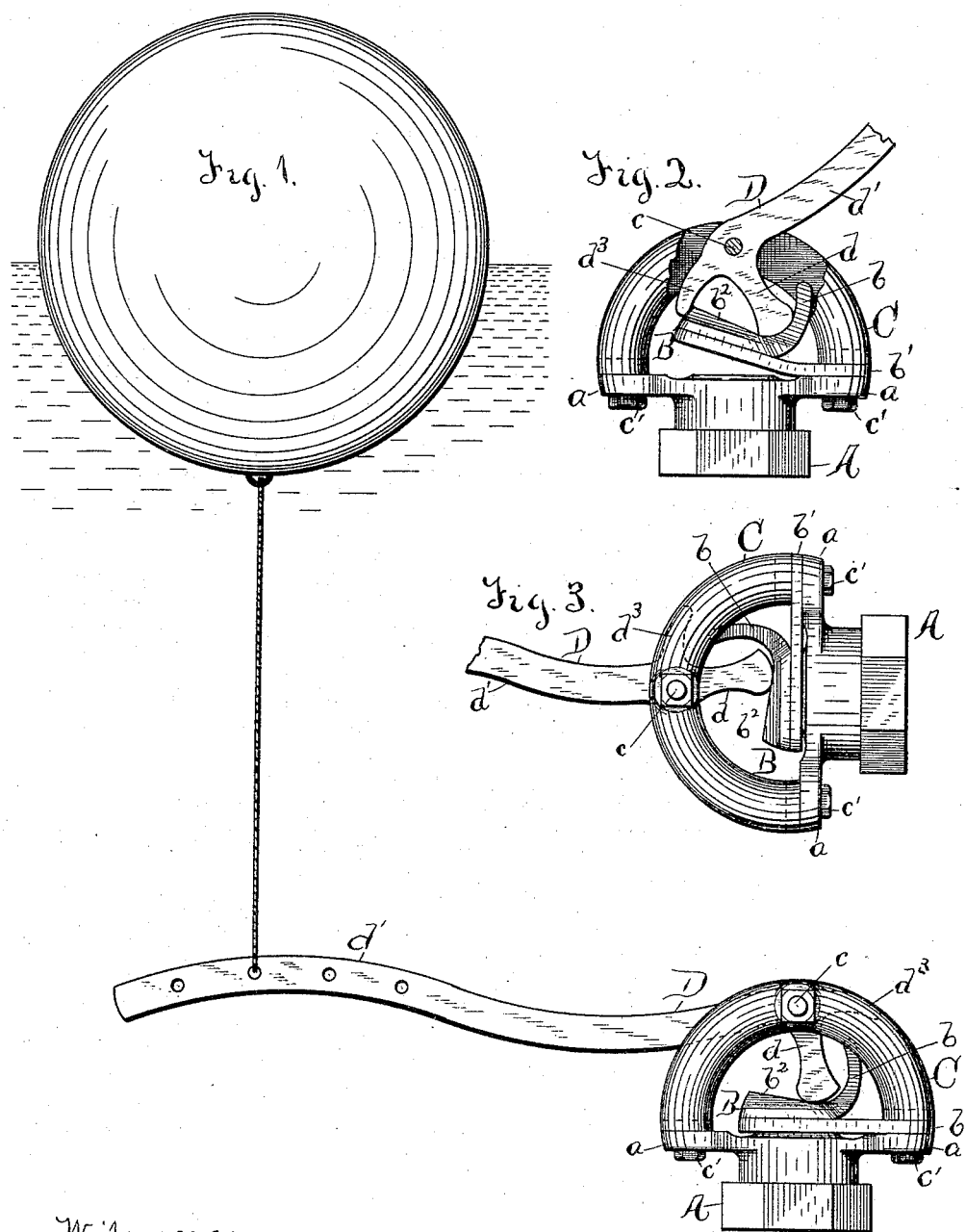

THOMAS W. BEAL, OF SANDWICH, ILLINOIS, ASSIGNOR TO THE SANDWICH ENTERPRISE COMPANY, OF SAME PLACE.

FLOAT-VALVE.

SPECIFICATION forming part of Letters Patent No. 433,435, dated August 5, 1890.

Application filed October 18, 1887. Serial No. 252,754. (No model.)

*To all whom it may concern:*

Be it known that I, THOMAS W. BEAL, a citizen of the United States of America, residing at Sanwich, in the county of DeKalb and State of Illinois, have invented certain new and useful Improvements in Float-Valves, of which the following is a description.

My invention relates to those valves which are designed to maintain a certain height of water in a tank or reservoir, and which are operated by means of a body of low specific gravity, called a "float," which rides upon the surface of the water, rising and falling therewith, and which is possessed of sufficient buoyancy to open or close the valve. These valves are of two classes—first, those which are used upon an inlet-pipe to close the same when the water rises to the desired height, and, second, those which are used upon an outlet-pipe to open an escape when the required water-supply has accumulated, the upward pull of the float at the highest water-level being applied in the first instance to close the valve and in the second to open it.

In many cases it is a great convenience to be able to use the same pipe for either an inlet or an outlet pipe, as may be desired—as, for instance, where a number of connected tanks are arranged to fill from two or more sources and it is necessary to keep up the maximum head in one or more of the tanks and allow the overflow to pass into the others. In such a case it is of great advantage to be able to reverse the action of the valves when changing from one source of supply to another, inasmuch as the provision of means for so doing enables the tanks to be connected by single pipes, saving the expense of a second system thereof.

It is my object to provide a valve which will be capable, with the slightest possible change, of the operation of either of the two classes above mentioned, and the best form which I have devised to accomplish this is shown in the drawings furnished herewith, wherein—

Figure 1 is an elevation of such device arranged for use upon an inlet or supply pipe, the float being shown attached at the left; Fig. 2, a similar view of the same, arranged for application to an outlet or escape pipe; and Fig. 3, a like view of a modification thereof designed to adapt the invention to a horizontal pipe.

Describing said preferable construction from the drawings, A represents the valve-body, which may be of any suitable material, brass being perhaps the best, and which is provided with suitable screw-thread for attachment to the end of a pipe.

B is a hinged valve which is adapted to close on the seat of the valve-body.

The form of valve best adapted to the present use is that shown, which consists of a strap $b'$ of flexible material—as, for example, leather—which is secured at one side between the arch C and the ear $a$ by the bolt $c'$. This plate is stiffened and strengthened by a metal weight $b^2$ secured to its upper side. The upper surface of this weight is an incline sloping toward the valve-seat in the direction from which the arm $d$ of the lever D (described below) approaches to close the valve, and sufficiently steep to prevent said arm from passing entirely over it when rocked upon the pivot $c$.

$a\ a$ are ears projecting outward from the valve-body, to which an arch C is secured by bolts $c'\ c'$.

D is the valve-lever, which is pivoted to the arch substantially in line with the initial opening movement of the valve, and the short arm $d$ of which is so proportioned that it will just wedge between the pivot-bolt and the inclined upper surface of the valve, locking the latter to its seat against any pressure beneath it. The long arm of the lever $d'$ is of sufficient length to give the requisite leverage, and is punctured by a series of holes, which furnish means for the attachment of a cord or chain, by which the lever is connected with the float above. A finger $d^3$ is also provided upon the operating-lever D for the purpose of checking the opening movement of the valve when applied to an outlet-pipe, as hereinafter fully explained. The long arm $d'$ of the lever D should always project from the pivot $c$ in a horizontal direction; hence for use upon a vertical pipe I provide a bent or bell-crank lever, and for use upon a horizontal pipe a straight lever, as seen, respectively, in Figs. 1 and 3.

When the valve is attached to an inlet-pipe, as seen in Fig. 1, and the tank is not yet filled, the unsupported arm $d'$ drops downward, pressing the arm $d$ against an upwardly-projecting finger $b$, provided upon the valve B and holding the valve open. Now when the water has risen to the height which has been fixed by the length of the cord or chain by which the float is attached, the float will lift the arm $d'$, wedging the arm $d$ upon the valve and closing it tightly against the water-pressure in the pipe. As soon, however, as any water is used from the tank, the float falls with the surface of the water and the arm $d'$ is again allowed to open the valve. The latter will thus be automatically closed or opened as the water reaches or falls below the predetermined level.

To now change the valve so that the pipe to which it is attached may be used as an outlet or waste pipe, the pivot-bolt $c$ is removed and the lever D reversed—i. e., in the form shown in Fig. 1 the lever is turned about, as shown in Fig. 2, and in the form shown in Fig. 3 the lever is merely inverted, in both of said forms the reversal causing the finger $d^3$ to point in the opposite direction. The lever having been thus reversed its gravity tends to move the arm $d$ in the opposite direction from that above described, and hence to hold the valve closed, which is its normal condition while the tank is filling. When, however, the water reaches the desired level, the float will lift the long arm of the lever, and moving the arm $d$ against the finger $b$ open the valve and hold it open until the water-surface falls below the limit set. To prevent the valve from opening too far and the float from pulling the arm $d'$ of the lever D up so far that it will not fall by its own gravity when released, a finger $d^3$ is provided upon the lever D in position to engage with the valve B and check the opening movement thereof as well as of the lever D when the required opening has been attained.

I do not desire to limit myself to the exact construction above described, as numerous variations therefrom are possible without departing from the essential feature of my invention, which I consider to be the provision in a float-valve of the class shown of an operating-lever, which, by a mere reversal, adapts the valve to use upon either the inlet or the outlet pipe, the upward pull of the float when the water is at the highest level applying in the one case a positive force to close the valve and in the other a positive force to open the valve. Certain minor improvements in construction have also been made, all of which are defined in the following claims, wherein I point out that which I claim as new, and desire to secure by Letters Patent—

1. The combination of the valve-body, the hinged valve, and the reversible operating-lever provided with means of positive engagement with the valve in opposite directions when in its two positions, substantially as described.

2. The combination of the valve-body, the hinged valve, and the reversible operating-lever provided with means of positive engagement with the valve in opposite directions when in its two positions, and pivoted to the valve-body substantially in line with the initial opening movement of the valve, substantially as described.

3. The combination of the valve-body, the hinged valve bearing the finger $b$, and the reversible operating-lever pivoted to the valve-body and having the arms $d\ d'$, substantially as described.

4. In combination, the valve-body bearing the arch C, the hinged valve provided with the finger $b$, the reversible operating-lever D, pivoted with relation to the valve substantially as shown, and having the three arms $d\ d'\ d^3$, and the float, all arranged and operating substantially as described.

THOMAS W. BEAL.

Witnesses:
 W. H. WALLACE,
 EUGENE HILL.